(12) United States Patent
Steinbrenner

(10) Patent No.: US 7,842,650 B2
(45) Date of Patent: Nov. 30, 2010

(54) MIXTURE FOR IMPROVED FOAMING IN THE EXTRACTION OF PETROLEUM OR NATURAL GAS

(75) Inventor: Ulrich Steinbrenner, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 126 days.

(21) Appl. No.: 12/374,880

(22) PCT Filed: Jul. 17, 2007

(86) PCT No.: PCT/EP2007/057378

§ 371 (c)(1),
(2), (4) Date: Jan. 23, 2009

(87) PCT Pub. No.: WO2008/012242

PCT Pub. Date: Jan. 31, 2008

(65) Prior Publication Data

US 2009/0325824 A1    Dec. 31, 2009

(30) Foreign Application Priority Data

Jul. 24, 2006   (EP) ................... 06117712

(51) Int. Cl.
*B01F 17/00* (2006.01)
*C09K 8/38* (2006.01)
*E21B 21/16* (2006.01)

(52) U.S. Cl. .................. 507/102; 166/305.1; 166/309; 175/65; 175/69; 516/10; 516/18; 507/117; 507/138; 507/139; 507/202; 507/219; 507/265; 507/266

(58) Field of Classification Search ................. 507/102, 507/117, 138, 139, 202, 219, 265, 266; 166/305.1, 166/309; 175/65, 69; 516/10, 18
See application file for complete search history.

(56) References Cited

U.S. PATENT DOCUMENTS

| 3,251,417 A | 5/1966 | Holman et al. |
|---|---|---|
| 5,358,045 A | 10/1994 | Sevigny et al. |
| 5,614,473 A | 3/1997 | Dino et al. |
| 5,661,121 A | 8/1997 | Dahlgren et al. |
| 6,113,809 A | 9/2000 | Dino et al. |
| 6,942,031 B1 | 9/2005 | Kalfoglou et al. |
| 2008/0207939 A1 | 8/2008 | Tropsch et al. |
| 2008/0254695 A1 | 10/2008 | Jungen |

FOREIGN PATENT DOCUMENTS

| CA | 751200 A | 1/1967 |
|---|---|---|
| CA | 775399 A | 1/1968 |
| CA | 2222775 | 11/1996 |
| DE | 102004007152 A1 | 8/2005 |
| WO | WO-2005/090366 A1 | 9/2005 |

OTHER PUBLICATIONS

Cardani, C., et al., "Sulle 1,2-difenil-3,5-dicheto-pirazolidine" Instituto di Chimica del Politecnico, pp. 1353-1366, Milano, (1963).

*Primary Examiner*—Timothy J Kugel
(74) *Attorney, Agent, or Firm*—Connolly Bove Lodge & Hutz LLP

(57) ABSTRACT

The invention relates to a composition for producing foams, in particular for mineral oil and natural gas production.

17 Claims, No Drawings

MIXTURE FOR IMPROVED FOAMING IN THE EXTRACTION OF PETROLEUM OR NATURAL GAS

RELATED APPLICATIONS

This application is a national stage application (under 35 U.S.C. §371) of PCT/EP2007/057378, filed Jul. 17, 2007, which claims benefit of European Application No. 06117712.7, filed Jul. 24, 2006.

The invention relates to the use of a composition for producing foams, in particular for mineral oil and natural gas production.

It is known that foam formers can be used for various purposes in natural gas or mineral oil production.

Gas deposits having a high water content and a low gas pressure frequently exhibit a low output. The well fills completely or partly with water under these circumstances. Accordingly, the gas pressure of the deposit is opposed by the hydrostatic pressure of the water column in the well, which correspondingly reduces the output. It is known that this problem can be solved by introducing assistants for foam formation into the depth of the well. With the aid of the ascending gas, foam, which of course has a lower density than water, forms in the well and substantially reduces the hydrostatic pressure in the well. Accordingly, water and gas can be substantially more easily expelled and the output increases greatly as a result of this measure.

Furthermore, it is known, for example, that foams can be used for tertiary mineral oil production or as an assistant in drilling. The technique in which the drilling fluid used comprises foamed drilling fluids is also known as "aerated drilling".

Foam formers for mineral oil or natural gas production must be effective under the conditions prevailing in the deposit, i.e. in particular at the temperatures prevailing in the deposit and in the presence of deposit water having a high salt content.

U.S. Pat. No. 3,251,417 describes the use of isotridecanol ethoxylates for removing water from oil wells, gas wells and other wells. However, these surfactants are not tolerant to the salts frequently occurring in such deposits. Under highly saline conditions, their turbidity point is exceeded and the foam collapses.

CA 2,222,775 describes the use of amphoacetates (betaines) for foams in mineral oil production. These betaines have a pronounced foaming behavior and form stable foams even in the presence of hydrocarbons which are known to be antifoams.

CA 751,200 describes the use of foam in drilling fluids. In particular, the problem of producing stable foams in the presence of mineral oil, ions, in particular divalent ions, and clays is pointed out. Amine oxides are described as being particularly advantageous.

CA 775,399 describes the use of foams in secondary mineral oil production. Numerous different types are mentioned as surfactants, in particular quaternary ammonium salts, alkylphenol ethoxylates, sulfosuccinates and perfluorocarboxylates.

U.S. Pat. No. 5,358,045 describes the use of hydrotropes as additives to foamers in tertiary mineral oil production. It is pointed out in particular that the hydrotrope ensures that known good foamers, such as sulfonates, are compatible with the salt- and alkaline earth metal-containing deep waters.

Since these substances used as foamers give rise to costs and complicate the disposal of the waste water separated off, the object is to provide substances and/or processes which support the foamers which have proved useful in mineral oil and natural gas production, such as, for example, sulfates and sulfonates, phosphates, carboxylates, sulfosuccinates, betaines, quaternary ammonium salts, amine oxides, amine ethoxylates, amide ethoxylates, acid ethoxylates, alkyl glucosides, EO-PO block copolymers or long-chain fatty alcohol ethoxylates, so that more foam forms with the use of the same amount of foamer and under the conditions of mineral oil and natural gas production.

This object is surprisingly achieved by the use of a composition comprising at least
  a) at least one foamer selected from the group consisting of sulfates, sulfonates, phosphates, carboxylates, sulfosuccinates, betaines, quaternary ammonium salts, amine oxides, amine ethoxylates, amide ethoxylates, acid ethoxylates, alkyl glucosides, EO-PO block copolymers and long-chain fatty alcohol ethoxylates; and
  b) at least one cosurfactant different therefrom, of the structure x-y or x-y-z, in which
    x is a surfactant alcohol having 6 to 12 carbon atoms,
    y is an alkylene oxide block and
    z is a terminal group.

"Foamers", also referred to as foam formers or foaming agents, are understood as meaning substances which are surface-active in a manner known in principle and which have a certain film formation capacity and thus promote the production of foam.

A "sulfate" is understood as meaning a surface-active compound which has at least one $SO_4$ group in the molecule. Examples of sulfates which can be used according to the invention are
  fatty alcohol sulfates, such as, for example, coconut fatty alcohol sulfate (CAS 97375-27-4)—e.g. EMAL® 10G, Dispersogen® Si, Elfan® 280, Mackol® 100N,
  other alcohol sulfates—e.g. Emal® 71, Lanette® E,
  coconut fatty alcohol ether sulfate—e.g. Emal® 20C, Latemul® E150, Sulfochem® ES-7, Texapon® ASV-70 Spec., Agnique SLES-229-F, Octosol 828, POLYSTEP® B-23, Unipol® 125-E, 130-E, Unipol® ES-40,
  other alcohol ether sulfates—e.g. Avanel® S-150, Avanel® S 150 CG, Avanel® S 150 CG N, Witcolate® D51-51, Witcolate® D51-53.

"Sulfonate" is understood as meaning a surface-active compound which has at least one sulfonate group in the molecule. Examples of sulfonates which can be used according to the invention are
  alkylbenzenesulfonates—e.g. Lutensit® A-LBS, Lutensit® A-LBN, Lutensit® A-LBA, Marion® AS3, Maranil® DBS,
  alkanesulfonates—e.g. Alscoap OS-14P, BIO-TERGE® AS-40, BIO-TERGE® AS-40 CG, BIO-TERGE® AS-90 Beads, Calimulse® AOS-20, Calimulse® AOS-40, Calsoft® AOS-40, Colonial® AOS-40, Elfan® OS 46, Ifrapon® AOS 38, Ifrapon® AOS 38 P, Jeenate® AOS-40, Nikkol® OS-14, Norfox® ALPHA XL, POLYSTEP® A-18, Rhodacal® A-246L, Rhodacal® LSS-40/A,
  sulfonated oils, such as, for example, Turkey red oil,
  olefin sulfonates,
  aromatic sulfonates—e.g. Nekal® BX, Dowfax® 2A1.

A "phosphate" is understood here as meaning a surface-active compound which has at least one $PO_4$ group in the molecule. Examples of phosphates which can be used according to the invention are
  alkyl ether phosphates—e.g. Maphos® 37P, Maphos® 54P, Maphos® 37T,
  alkyl phosphates.

A "carboxylate" is understood as meaning a surface-active compound which has at least one carboxylate group in the molecule. Examples of carboxylates which can be used according to the invention are soaps—e.g. stearates, oleates, cocoates of the alkali metals or of ammonium, ether carboxylates—e.g. Akypo® RO 20, Akypo® RO 50, Akypo® RO 90.

A "sulfosuccinate" is understood as meaning a surface-active compound which has at least one $SO_3$ group and at least one succinate group in the molecule. Examples of sulfosuccinates which can be used according to the invention are dioctyl sulfosuccinate—e.g. Lutensit® A-BO.

Furthermore, a "betaine" is understood as meaning a surface-active compound which carries at least one positive and at least one negative charge under conditions of use, i.e. under conditions which prevail in the well, or conditions as were chosen for the simulation in the examples. Examples of betaines which can be used according to the invention are cocamidopropylbetaine—e.g. MAFO® CAB, Amonyl® 380 BA, AMPHOSOL® CA, AMPHOSOL® CG, AMPHOSOL® CR, AMPHOSOL® HCG; AMPHOSOL® HCG-50, Chembetaine® C, Chembetaine® CGF, Chembetaine® CL, Dehyton® PK, Dehyton® PK 45, Emery® 6744, Empigen® BS/F, Empigen® BS/FA, Empigen® BS/P, Genagen® CAB, Lonzaine® C, Lonzaine® CO, Mirataine® BET-C-30, Mirataine® CB, Monateric® CAB, Naxaine® C, Naxaine® CO, Norfox® CAPB, Norfox® Coco Betaine, Ralufon® 414, TEGO®-Betain CKD, TEGO® Betain E KE 1, TEGO®-Betain F, TEGO®-Betain F 50.

A "quaternary ammonium salt" is understood as meaning a surface-active compound which has at least one $R_4N^+$ group in the molecule. Examples of quaternary ammonium salts which can be used according to the invention are halides, methosulfates, sulfates and carbonates of coconut fatty-, tallow fatty- or cetyl/oleyltrimethylammonium, An "amine oxide" is understood as meaning a surface-active compound which has at least one N—O group in the molecule. Examples of amine oxides which can be used according to the invention are lauryl amine oxide e.g. Mazox® LDA.

Furthermore, an "amine ethoxylate" is understood as meaning a surface-active compound which has at least one —N[$CH_2CH_2O$—]$_2$ group in the molecule. Examples of amine ethoxylates which can be used according to the invention are fatty amine ethoxylates—e.g. Lutensol® FA, Lutensol® FA 1ST, Lutensol® TA 15, Lutensol® FA 12K.

An "amide ethoxylate" is understood as meaning a surface-active compound which has at least one —C(=O)N[$CH_2CH_2O$— or —C(=O)N[$CH_2CH_2O$]$_2$ group in the molecule. Examples of amide ethoxylates which can be used according to the invention are fatty acid amide ethoxylates—e.g. Lutensol® FSA.

An "acid ethoxylate" is understood as meaning a surface-active compound which has at least one —C(=O)O$CH_2CH_2O$ group in the molecule. Examples of acid ethoxylates which can be used according to the invention are fatty acid PEG esters—e.g. Emulan® A, Emulan® A Spezial, Adekaestol® OEG-102, Adekaestol® OEG-104, Adekaestol® OEG-106, Adekaestol® OEG-204, Emanon® 4110, Paxonic® MA, Sinopol® 170, Sinopol® 170F.

An "alkyl glucoside" is understood as meaning a surface-active compound which has at least one unit derived from sugar in the molecule. Examples of alkyl glucosides which can be used according to the invention are sugar acetals—e.g. Lutensol GD® 70, Plantacare® 1200 UP.

An "EO-PO block copolymer" in turn is understood as meaning a surface-active compound which is composed of a plurality of units. These units are ethylene oxide (EO) and propylene oxide (PO) units. These are arranged in the molecule substantially in blocks. The number of EO or PO units is from 5 to 50, preferably from 10 to 30. The weight ratio of EO to PO is from 20:80 to 80:20, preferably from 50:50 to 80:20. Examples of EO-PO block copolymers which can be used according to the invention are Pluronic® PE 6200, PE 6400, PE 6800, PE 10300, PE 10500, Pluronic® F127, Pluronic® F108, Synperonic® F108, Synperonic® F 127, Synperonic® F68.

Finally, a "long-chain fatty alcohol ethoxylate" is understood as meaning a surface-active compound which has at least one ethoxylate group in the molecule. The term is also intended to include, in a manner known in principle, ethoxylates based on oxo alcohols. In this context, a compound which has at least 10 carbon atoms, preferably at least 12 carbon atoms, particularly preferably 12 to 22 carbon atoms and very particularly 12 to 18 carbon atoms, is designated as being long-chain, Examples of long-chain fatty alcohol ethoxylates which can be used according to the invention are products of the series Lutensol® AO, Lutensol® TO, Lutensol AT®, Lutensol® A . . . N, Lialet® 123, Lialet® 125, Marlipal® O25, Marlipal® O13.

Hydrophilic fatty alcohol ethoxylates are preferably used, i.e. compounds whose proportion of EO in percent by weight is from 60% to 95%, preferably from 70% to 90%.

According to the invention, the foamers are used in combination with at least one cosurfactant of the general formula x-y or x-y-z, where x is a surfactant alcohol, y is an alkylene oxide block and z is a terminal group.

The term "surfactant alcohol" represents monoalcohols which can act as a hydrophobic component in the surfactant. In addition to the OH group, they comprise a hydrocarbon group which preferably has no further substituents.

The surfactant alcohol used according to the invention comprises 6 to 12 carbon atoms, preferably 8 to 10 carbon atoms and particularly preferably 10 carbon atoms. It may comprise aliphatic or aliphatic/aromatic alcohols. It preferably comprises aliphatic alcohols. A mixture of different surfactant alcohols can of course also be used.

Preference is given to using a composition as described above, in which, independently of one another, the surfactant alcohol x has on average from 0 to 3 branches, preferably from 1 to 2.5 branches and particularly preferably from I to 1.5 branches, the surfactant alcohol x is a Guerbet alcohol, the surfactant alcohol x has a composition comprising 2-propylheptanol and methylpropylhexanols, the alkylene oxide block y has from 3 to 30 alkylene oxide units, preferably from 5 to 25 alkylene oxide units and particularly preferably from 7 to 20 alkylene oxide units, the alkylene oxide groups of the alkylene oxide block y are selected from the group consisting of ethylene oxide, propylene oxide, butylene oxide, pentylene oxide and hexylene oxide, preferably consisting of ethylene oxide, propylene oxide and butylene oxide, particularly preferably consisting of ethylene oxide and propylene oxide and very particularly preferably consisting of ethylene oxide, the proportion of ethylene oxide in the alkylene oxide block y is at least 70 mol %, preferably at least 80 mol % and particularly preferably at least 90 mol %, the alkylene oxide block y has a block distribution, an alternating distribution, a random distribution or a gradient, preferably a block distribution, a random distribution or a gradient and particularly preferably a block distribution or a random distribution—in the case of a block distribution in an alkylene oxide block consisting of ethylene oxide and higher alkylene oxide units, the part consisting of higher alkylene oxide units is very particularly preferably arranged directly after the surfactant alcohol, giving a structure of the type x-$y_1$-$y_2$-z, where $y_1$ is an alkylene oxide block consisting of alkylene oxides having more than 2 carbon atoms and $y_2$ is an ethylene oxide block, the terminal group z is sulfate, phosphate or carboxylate, preferably sulfate or phosphate, the terminal group z is not present, i.e. a cosurfactant x-y is preferred.

Very particularly preferred compositions are those in which y consists of from 8 to 25 ethylene oxide units and from 0 to 2 propylene oxide units, in particular of from 10 to 20 ethylene oxide units, and z is sulfate or is not present. In the very particularly preferred case where z is not present, the general formula x-y-z corresponds to the formula x-y in these cases, the OH group of the alkylene block terminates the molecule.

The degree of branching of the surfactant alcohol is calculated from the number of saturated carbon atoms in the alcohol which are bonded to 3 other carbon atoms, plus twice the number of those which are bonded to 4 other carbon atoms. The degree of branching can easily be determined by 13C/1H-NMR techniques.

All definitions of the cosurfactant x-y or x-y-z used according to the invention and parts thereof, e.g. in the case of alcohol x, relate to the statistically average molecule. Of course, it is known to the person skilled in the art that industrial surfactant alcohols and alkoxylates thereof are mixtures. Furthermore, the definitions do not reveal the dispersity of the distribution of the alkoxylates in the mixture, although a dispersity—defined as the quotient of weight average and number average molecular weight of x-y-z—of less than 2.0 is preferred.

Furthermore, it is preferably a cosurfactant which is composed of a Guerbet alcohol having 6 to 12 carbon atoms and 10 to 20 ethylene oxide units.

Furthermore, a preferred composition is one as described above, in which the weight ratio of foamer a):cosurfactant b) is from 0.1:1 to 100:1, preferably from 0.5:1 to 10:1, particularly preferably from 1:1 to 10:1 and in particular from 1:1 to 5:1, such as, for example, 2:1 or 3:1.

According to the invention, the composition described is used for producing foams. Techniques for producing foams are known to the person skilled in the art.

These can in principle be all types of foams. They are preferably foams in which the liquid to be foamed is a predominantly aqueous liquid, in particular water.

The composition used according to the invention is suitable in particular for foaming salt-containing water, for example salt-containing deposit water. The salts may be in particular those salts which usually occur in deposit water. Examples comprise alkali metal halides, such as, in particular, sodium chloride, but also soluble Ca and/or Mg salts. In a preferred embodiment of the invention, the aqueous liquid to be foamed comprises at least 1% by weight of dissolved salts, preferably at least 2% by weight and particularly preferably at least 5% by weight.

The foam may be formed at all temperatures In a preferred embodiment of the invention, the temperature of the liquid to be foamed is at least 40° C., for example from 40 to 130° C., preferably from 40 to 100° C.

In a preferred embodiment of the invention, the foam is used for extracting mineral oil or natural gas. It may be used thereby in all phases of the extraction of mineral oil and/or natural gas. Examples comprise techniques for drilling in which the drilling fluid used is foamed by blowing in air (so-called "aerated drilling"), the actual production, in particular in natural gas production, by introducing the composition into a production well which is completely or partly filled with water, a foam forming as a result of ascending gas, or in techniques of tertiary mineral oil production in which foams are used.

The components a) and b) can be used for producing foams in the form of a suitable formulation, for example dissolved in water or a predominantly aqueous solvent mixture. However, the mixture can also be added as such to the medium to be foamed. The components can in each case also be added individually (as a kit of parts) to the medium to be foamed.

By using a kit of parts, various advantages are possible—thus, for example, the ratio of a) to b) can be directly adapted to the circumstances on site.

The present invention likewise relates to a process for producing mineral oil and/or gas, in which a composition as described above is used. Details thereof have already been described.

The present invention likewise relates to a mineral oil/water mixture which comprises a cosurfactant b) or a composition as described above, as well as to a mineral oil which comprises a cosurfactant b) or the composition as described above.

Finally, an embodiment of the present invention also relates to the mineral oil produced by one of the processes described above.

The present invention is explained in more detail below by examples:

For assessing the foam-improving effect, the following apparatuses were used/the following procedure was adopted:

1) Foam Tester:

The foam tester consisted of a thermostated and graduated 1500 ml glass cylinder, a circulation pipe of about 5 mm internal diameter and a pump having a circulation rate of 200 l/h. The test solution was taken off from the bottom of the glass cylinder and added to the vessel again from the top, with the result that air was introduced and foam was produced.

2) Test Liquid:

The test liquid consisted of

5% by weight of model oil (C18 to C36-hydrocarbon, comparable with diesel oil), or 0.01 or 0.1% by weight of surfactant or surfactant mixture (calculated on the basis of 100% of active substance)

model water at greater depth to 100% by weight (aqueous solution of sodium chloride and alkaline earth metal chlorides, 64 g of salt per liter, ionic strength 6.7 mol/l)

3) Test Method 500 ml of the liquid to be tested were thermostated at 50° C. and then foamed for 10 minutes, a constant height being established by foam formation and foam disintegration (equilibrium foam). Foam formation was then stopped and the foam disintegration monitored as a function of the waiting time.

4) Results

COMPARATIVE EXAMPLE 1

| Only foamer a): 0.1% by weight of cocamidopropylbetaine | |
|---|---|
| equilibrium foam: | 280 ml |
| 1 minute after stoppage | 20 ml |
| 3 minutes after stoppage | 0 ml |
| 5 minutes after stoppage | 0 ml |

COMPARATIVE EXAMPLE 2

| Only foamer a): 0.01% by weight of cocamidopropylbetaine | |
|---|---|
| equilibrium foam: | 220 ml |
| 1 minute after stoppage | 60 ml |
| 3 minutes after stoppage | 20 ml |
| 5 minutes after stoppage | 0 ml |

COMPARATIVE EXAMPLE 3

| Only cosurfactant b): 0.1% by weight of C10 Guerbet alcohol × 14 EO | |
|---|---|
| equilibrium foam: | 500 ml |
| 1 minute after stoppage | 80 ml |
| 3 minutes after stoppage | 20 ml |
| 5 minutes after stoppage | 20 ml |

COMPARATIVE EXAMPLE 4

| Only cosurfactant b): 0.01% by weight of C10 Guerbet alcohol × 14 EO | |
|---|---|
| equilibrium foam: | 320 ml |
| 1 minute after stoppage | 40 ml |
| 3 minutes after stoppage | 20 ml |
| 5 minutes after stoppage | 0 ml |

EXAMPLE 1

| Combination of foamer a): 0.05% by weight of cocamidopropylamine cosurfactant b): 0.05% by weight of C10 Guerbet alcohol × 14 EO | |
|---|---|
| equilibrium foam: | 1120 ml |
| 1 minute after stoppage | 760 ml |
| 3 minutes after stoppage | 80 ml |
| 5 minutes after stoppage | 40 ml |

EXAMPLE 2

| Combination of foamer a): 0.005% by weight of cocamidopropylamine cosurfactant b): 0.005% by weight of C10 Guerbet alcohol × 14 EO | |
|---|---|
| equilibrium foam: | 500 ml |
| 1 minute after stoppage | 80 ml |
| 3 minutes after stoppage | 40 ml |
| 5 minutes after stoppage | 20 ml |

It is clearly evident that the combinations according to the invention of foams a) and cosurfactants b) give better results than the respective individual components. The individual components cooperate synergistically in the foam formation. Both the amount of the foam formed in equilibrium and the stability as a function of time are substantially greater in each case.

I claim:

1. A composition for producing foams from liquids comprising
   a) a foamer selected from the group consisting of sulfates, sulfonates, phosphates, carboxylates, sulfosuccinates, betaines, quaternary ammonium salts, amine oxides, amine ethoxylates, amide ethoxylates, acid ethoxylates, alkyl glucosides, EO-PO block copolymers, and long-chain fatty alcohol ethoxylates; and
   b) a cosurfactant different from said foamer and having the structure x-y, wherein
      x is a surfactant alcohol having from 6 to 12 carbon atoms; and
      y is an alkylene oxide block having from 5 to 25 alkylene oxide units.

2. The composition of claim 1, wherein the weight ratio of said foamer to said cosurfactant is in the range of from 0.1:1 to 100:1.

3. The composition of claim 2, wherein the weight ratio of said foamer to said cosurfactant is in the range of from 1:1 to 10:1.

4. The composition of claim 3, wherein the weight ratio of said foamer to said cosurfactant is in the range of from 2:1 to 5:1.

5. The composition of claim 1, wherein said liquid to be foamed is an aqueous liquid.

6. The composition of claim 5, wherein said aqueous liquid comprises at least 1% by weight of dissolved salts.

7. The composition of claim 5, wherein the temperature of said aqueous liquid is at least 40° C.

8. The composition of claim 5, wherein said foam is used for extracting mineral oil and/or natural gas.

9. The composition of claim 1, wherein said surfactant alcohol is an aliphatic surfactant alcohol having from 8 to 10 carbon atoms.

10. The composition of claim 1, wherein, independently of one another,
    said surfactant alcohol has on average from 0 to 3 branches;
    the alkylene oxide groups of said alkylene oxide block are selected from the group consisting of ethylene oxide, propylene oxide, butylene oxide, pentylene oxide, and hexylene oxide;
    the proportion of ethylene oxide in said alkylene oxide block is at least 70 mol %; and
    said alkylene oxide block has a block distribution, an alternating distribution, a random distribution, or a gradient.

11. The composition of claim 1, wherein, independently of one another,
- said surfactant alcohol has on average from 1 to 2.5 branches;
- the alkylene oxide groups of said alkylene oxide block are selected from the group consisting of ethylene oxide, propylene oxide and butylene oxide; and
- the proportion of ethylene oxide in said alkylene oxide block is at least 80 mol %.

12. The composition of claim 1, wherein, independently of one another,
- said surfactant alcohol has 10 carbon atoms;
- said surfactant alcohol has on average from 1 to 1.5 branches;
- said surfactant alcohol is a Guerbet alcohol;
- said surfactant alcohol has a composition comprising 2-propylheptanol and methylpropylhexanols;
- said alkylene oxide block has from 7 to 20 alkylene oxide units;
- the alkylene oxide groups of said alkylene oxide block are selected from the group consisting of ethylene oxide and propylene oxide; and
- the proportion of ethylene oxide in said alkylene oxide block is at least 90 mol %.

13. A process for extracting mineral oil and/or natural gas comprising producing a foam from a liquid using a composition comprising (a) a foamer selected from the group consisting of sulfates, sulfonates, phosphates, carboxylates, sulfosuccinates, betaines, quaternary ammonium salts, amine oxides, amine ethoxylates, amide ethoxylates, acid ethoxylates, alkyl glucosides, EO-PO block copolymers, and long-chain fatty alcohol ethoxylates; and (b) a cosurfactant different from said foamer and having the structure x-y, wherein
- x is a surfactant alcohol having from 6 to 12 carbon atoms; and
- y is an alkylene oxide block having from 5 to 25 alkylene oxide units.

14. The process of claim 13, wherein said surfactant alcohol is an aliphatic surfactant alcohol having from 8 to 10 carbon atoms.

15. The process of claim 13, wherein said process further comprise introducing said composition into a production well completely or partly filled with water, resulting in a foam forming as a result of gas ascending from the deposit in said production well.

16. The process according to claim 13, wherein said process is a tertiary mineral oil production process.

17. The process according to claim 13, further comprising a drilling technique that employs a foamed drilling fluid.

* * * * *